D. W. DAVIS.
STORAGE BATTERY.
APPLICATION FILED JUNE 2, 1919.
1,359,491.
Patented Nov. 23, 1920.
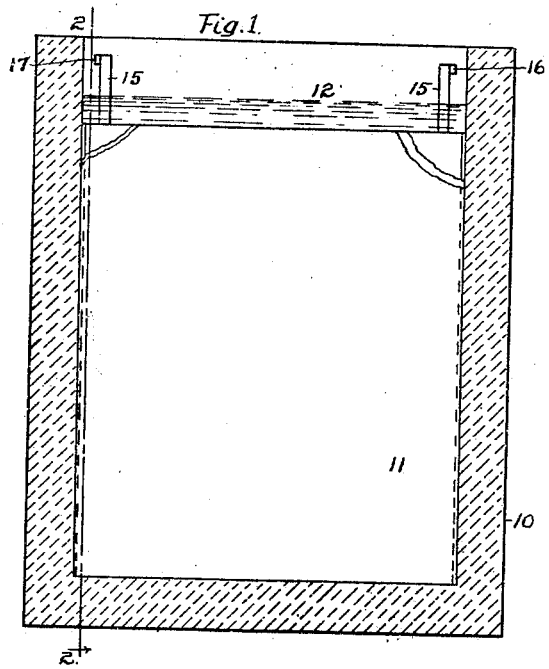
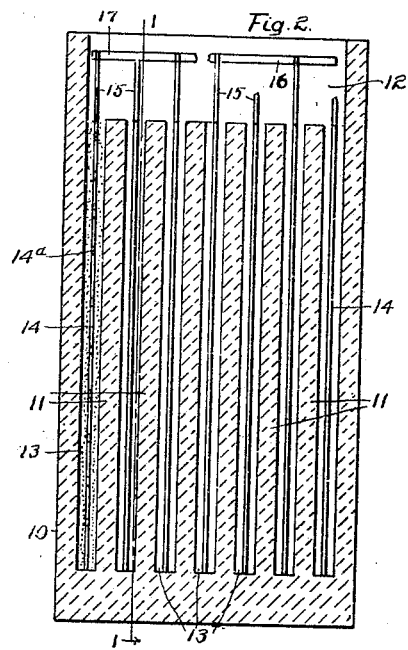
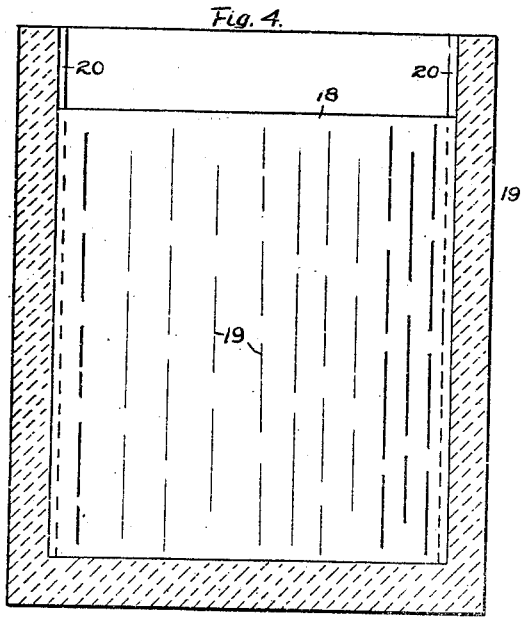
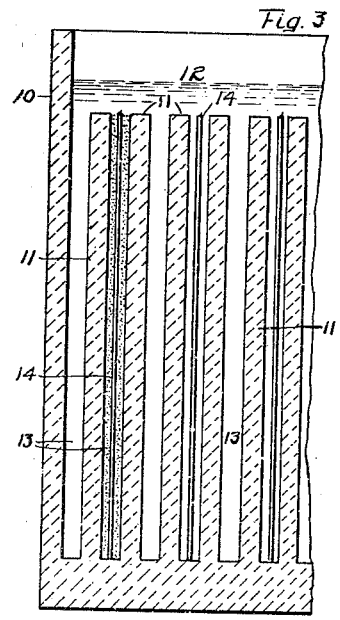
Dean W. Davis
INVENTOR
by Elwin M. Hulse
ATTORNEY.

UNITED STATES PATENT OFFICE.

DEAN W. DAVIS, OF FORT WAYNE, INDIANA.

STORAGE BATTERY.

1,359,491.

Specification of Letters Patent. Patented Nov. 23, 1920.

Application filed June 2, 1919. Serial No. 301,208.

*To all whom it may concern:*

Be it known that I, DEAN W. DAVIS, a citizen of the United States, residing at Fort Wayne, in the county of Allen and State of Indiana, have invented new and useful Improvements in Storage Batteries, of which the following is a specification.

The invention relates to storage batteries and particularly to the construction of cells for said batteries, and its object is to provide a cheap and durable cell having a high degree of efficiency.

In prior constructions of storage batteries the active material is formed into a paste and pressed into lead plates or grids and the plates are suspended in parallel relation in a container or jar, the positive and negative plates or electrodes being alternately arranged. The electrodes are commonly separated from one another by means of thin sheets of wood, strips of rubber or other suitable material. In the cycles of charging and discharging batteries of this type small particles of active material become loosened from the electrodes and drop to the bottom of the container where they accumulate. When the accumulation of the material reaches the lower ends of the electrodes the material short-circuits the electrodes and the action of the battery or cell is destroyed. Where the cell is built to give a high current on discharge the electrodes must be formed in comparatively thin sheets to avoid buckling or warping of the same when the cell is discharging or is being charged, the heavy charge or discharge also tending to loosen the active material on the electrodes.

By my invention I have eliminated all of the above disadvantages and others hereinafter set forth and I accomplish the same by isolating each electrode from the others so that all short-circuiting of the electrodes and buckling or warping thereof is avoided and each molecule of the active material is effective to perform its functions in the cell.

In the accompanying drawings I have illustrated one form of the invention in which—
Figure 1 is a longitudinal cross-section of a cell constructed in accordance with the invention; Fig. 2 a cross-section on line 2—2 of Fig. 1; Fig. 3 a cross-section similar to Fig. 2 with the exception that alternate compartments are filled with electrolyte rather than occupied by an electrode and Fig. 4 is a longitudinal cross-section of a cell having a modified form of partition.

Referring to the drawings, 10 indicates a jar or container formed of suitable non-conducting material and 11 are partitions extending from the bottom of the jar to a suitable height, the space between the top edges of the partitions and the top or mouth of the jar forming a cavity 12 for a small reserve supply of electrolyte as hereinafter described. The spaces between partitions 11 form compartments 13 which are isolated mechanically by the partitions, all of the compartments having communication with cavity 12. The partitions are formed of any suitable porous material such as filter clay, a porous grade of porcelain or any other suitable porous non-conducting material.
and in order to produce an economical cell the jar and partitions may be integrally cast or molded of said material. as shown in Figs. 1, 2 and 3. and when so formed, the outer surface of the jar will be glazed or otherwise treated or coated to render the wall of the jar leakage proof.

An electrode 14 consisting of a sheet of lead or a cast lead plate or other suitable form of electrode is suitably supported in each compartment 13 and a powdered form of active material having a positive electrical action is placed or loosely packed in alternate compartments and about the electrodes therein, and a similar form of active trodes therein, and a similar form of active material having a negative electrical action is loosely packed in the remaining compartments and about the electrodes therein. Each electrode may be perforated laterally at various points to receive material, as shown at 14ª, Fig. 2, for the purpose of increasing the capacity of said compartments for said material. Suitable extensions 15 are provided at the upper edges of the electrodes which project upwardly and to which bars 16 and 17 are secured, bar 16 being secured to the extensions on the positive electrodes and bar 17 being secured to the extensions on the negative electrodes. A suitable electrolyte is added or placed in the cell the level of the same being at a desired or selected height above partitions 11 in cavity 12 to form a reserve supply of the same which is available for all the compartments 13. A suitable cover is secured to the top or mouth of the container to prevent spilling or the escape of the electrolyte.

I may form the electrodes of any suitable material and may use any form of active material. I may also use any form of partition to divide the cell into compartments mechanically isolated from each other and may use as material for said partitions any suitable non-conducting material as rubber and form thin slots or apertures therein which will permit of communication between opposite sides of the partition without permitting the active material to pass through. In Fig. 4 I have illustrated such slotted partitions 18 having any number of slots 19 therein, the partitions being suitably sealed in the container, as in vertical grooves 20 formed in the wall of the container. The construction illustrated in Fig. 4 permits different forms of material to be used in the container and in the partitions, such as rubber, ebonite, glass, etc., for the container, and the same or other materials for the partitions.

Where the jar and partitions are formed of the same porous material the cell will be placed in a suitable protecting container.

I may form as many compartments in the cell and use as many electrodes therein as may be desired, I may make the compartments as wide as desired. For some purposes it may be desirable to use every alternate compartment for an electrode as shown in Fig. 3, thus providing a compartment for electrolyte between each two electrodes.

It will be noted that as each compartment is mechanically isolated from each adjoining or neighboring compartment any accumulation of active material in the bottom of a compartment can not short-circuit the electrode in that compartment and that the isolation of the electrodes in the several compartments has no effect whatever on the action of the cell. The danger of short-circuiting of the electrodes by accumulation of active material being eliminated the danger of buckling or warping of the electrodes is also eliminated and the active material for each electrode being confined in the compartment containing that electrode each molecule of the material is useful in performing the function for which it is intended, particularly since the active material is not baked into a hard mass to prevent its separation as in other batteries. Hence my battery is superior in capacity to other batteries of which I have knowledge.

What I claim is:

1. In a storage battery a container, a series of fixed porous partitions in the container forming a series of isolated compartments, an electrode in each compartment, alternate electrodes being positive and the remainder negative, loose active material packed in each compartment about the electrode therein and an electrolyte common to all the compartments.

2. In a storage battery a container, a series of parallel porous partitions integral with the bottom and two opposite side walls of the container and dividing the container into a series of compartments, an electrode in each compartment, alternate electrodes being positive and connected together and the remainder of the electrodes being negative and connected together, active material packed in each compartment in contact with the electrode therein and an electrolyte common to all the compartments.

In witness whereof, I have hereunto subscribed my name this 29th day of May, 1919.

DEAN W. DAVIS.